US006804221B1

(12) United States Patent
Magret et al.

(10) Patent No.: US 6,804,221 B1
(45) Date of Patent: Oct. 12, 2004

(54) MICROMOBILITY USING MULTICAST

(75) Inventors: Vincent Magret, Dallas, TX (US); Vinod Kumar Choyi, Dallas, TX (US)

(73) Assignee: Alcatel, Paris (FR)

( * ) Notice: Subject to any disclaimer, the term of this patent is extended or adjusted under 35 U.S.C. 154(b) by 758 days.

(21) Appl. No.: 09/602,712

(22) Filed: Jun. 26, 2000

(51) Int. Cl.[7] .................................................. H04Q 7/24
(52) U.S. Cl. ........................ 370/338; 370/312; 370/432
(58) Field of Search ................................. 370/310, 312, 370/328, 329, 331, 390, 400, 401, 432, 338; 455/432.1, 433, 435.1, 458; 709/227, 224

(56) References Cited

U.S. PATENT DOCUMENTS

| | | | |
|---|---|---|---|
| 5,325,362 A | 6/1994 | Aziz | |
| 5,353,412 A | 10/1994 | Douglas et al. | |
| 5,537,679 A | 7/1996 | Crosbie et al. | |
| 5,561,840 A | 10/1996 | Alvesalo et al. | |
| 5,570,366 A | 10/1996 | Baker | |
| 5,572,528 A | 11/1996 | Shuen | |
| 5,590,126 A | 12/1996 | Mishra et al. | |
| 5,754,547 A | 5/1998 | Nakazawa | |
| 5,825,759 A | 10/1998 | Liu | |
| 5,845,079 A | 12/1998 | Wada et al. | |
| 5,862,345 A | 1/1999 | Okanoue et al. | |
| 5,926,101 A | 7/1999 | Dasgupta | |
| 5,930,248 A | 7/1999 | Langlet et al. | |
| 5,949,760 A | 9/1999 | Stevens et al. | |
| 6,002,931 A | 12/1999 | Yamaguchi | |
| 6,018,573 A | 1/2000 | Tanaka | |
| 6,041,358 A | 3/2000 | Huang et al. | |
| 6,061,650 A | 5/2000 | Malkin et al. | |
| 6,487,605 B1 * | 11/2002 | Leung | 709/245 |
| 6,501,746 B1 * | 12/2002 | Leung | 370/338 |
| 6,636,498 B1 * | 10/2003 | Leung | 370/338 |
| 2001/0036834 A1 * | 11/2001 | Das et al. | 455/458 |
| 2002/0026525 A1 * | 2/2002 | Armitage | 709/238 |
| 2002/0046287 A1 * | 4/2002 | La Porta et al. | 709/230 |

FOREIGN PATENT DOCUMENTS

WO  WO 00/54475  9/2000

OTHER PUBLICATIONS

Xylomenos et al. "IP Multicast for Mobile Hosts". IEEE. Jan. 1997. pp. 54–58.*

(List continued on next page.)

*Primary Examiner*—Chi Pham
*Assistant Examiner*—Derrick W Ferris
(74) *Attorney, Agent, or Firm*—Larry Moskowitz; Jessica W. Smith; V. Lawrence Sewell

(57) ABSTRACT

The invention is a method and apparatus for registering a mobile node in both home and in foreign domains. A base station informs a base station router of the presence of a mobile entering the base station's coverage area by sending a mobile node advertisement message to a base station router. In addition, the mobile node sends a mobile IP registration request to the base station router. The base station router appends a base station router extension message to the mobile IP registration request (which contains an IP address of the base station router) and forwards the mobile IP registration request to a main access router. The main access router appends a multicast address extension to the mobile IP registration reply. The multicast address extension contains the multicast address allocated for the mobile node.

7 Claims, 9 Drawing Sheets

FLOW CHART OF THE STEPS INVOLVED IN REGISTERING A MOBILE IN A FOREIGN DOMAIN

OTHER PUBLICATIONS

Chen, Xiaoqiang. "Effect of Caching on Routing–Table Lookup in Muiltimedia Environment". IEEE. Apr. 7–11, 1991. pp. 1228–1236.*

Yang et al. "An Efficient Multicast Delivery System to Support Mobile IP". IEEE. 1999. pp. 683–688.*

Mysore et al. "Performance of Transporting Protocols over a Multicasting–based Architecture for Internet Host Mobility". IEEE. Jun. 7–11, 1998. pp. 1817–1823.*

Wu et al. "Caching Location Data in Mobile Networking". IEEE. Oct. 6, 1993. pp. 71–76.*

* cited by examiner

- USAGE: A BASE STATION SENDS THIS MESSAGE TO ITS BSR WHENEVER THE BASE STATION DISCOVERS THAT A NEW MOBILE HAS ENTERED ITS COVERAGE AREA. THE MESSAGE IS ALSO SENT PERIODICALLY TO REFRESH BINDING CACHE ENTRIES IN THE BSR. IN THIS CASE THE MESSAGE INCLUDES THE LIST ON LINK-LAYER INFORMATION OF ALL THE MOBILE NODE CURRENTLY ATTACHED TO THE BASE STATION.

```
 0                   1                   2                   3
 0 1 2 3 4 5 6 7 8 9 0 1 2 3 4 5 6 7 8 9 0 1 2 3 4 5 6 7 8 9 0 1 2
+-+-+-+-+-+-+-+-+-+-+-+-+-+-+-+-+-+-+-+-+-+-+-+-+-+-+-+-+-+-+-+-+
|    TYPE     |  SUB-TYPE     |    LENGTH                       |
+-+-+-+-+-+-+-+-+-+-+-+-+-+-+-+-+-+-+-+-+-+-+-+-+-+-+-+-+-+-+-+-+
|              LENGTH OF ONE ITEM                                |
+-+-+-+-+-+-+-+-+-+-+-+-+-+-+-+-+-+-+-+-+-+-+-+-+-+-+-+-+-+-+-+-+
|         ONE OR MORE LINK-LAYER SPECIFIC INFORMATION            |
+-+-+-+-+-+-+-+-+-+-+-+-+-+-+-+-+-+-+-+-+-+-+-+-+-+-+-+-+-+-+-+-+
|              ... / ...                                         |
```

- TYPE: TBD
- SUB-TYPE: NEW MOBILE NODE (n) OR LINK-LAYER TABLE UPDATE (u). THE NEW MOBILE NODE TYPE MESSAGE IS SENT WHENEVER THE BASE STATION DISCOVERS THAT A NEW MOBILE NODE HAS ENTERED THE COVERAGE AREA. THE LINK-LAYER TABLE UPDATE IS SENT PERIODICALLY BY THE BASE STATION TO REFRESH BINDING ENTRIES AT THE BSR.
- LENGTH: N, WHERE N IS THE NUMBER OF LINK-LAYER INFORMATION SENT. THE INFORMATION SENT CAN BE THE MAC LAYER ADDRESS FOR INSTANCE IF THE WIRELESS LINK IS 802.11 COMPLIANT.
- LENGTH OF ONE ITEM: M, WHERE M IS EQUAL TO THE LENGTH OF A SINGLE LINK-LAYER SPECIFIC INFORMATION.

FORMAT USED FOR THE MOBILE NODE ADVERTISEMENT MESSAGE

FIG. 1

- USAGE: THE EXTENSION IS APPENDED AFTER THE MOBILE NODE'S REGISTRATION REQUEST AND CONTAINS THE IP ADDRESS OF THE BSR FORWARDING THE MOBILE NODE'S REGISTRATION REQUEST.

```
 0                   1                   2                   3
 0 1 2 3 4 5 6 7 8 9 0 1 2 3 4 5 6 7 8 9 0 1 2 3 4 5 6 7 8 9 0 1 2
+-+-+-+-+-+-+-+-+-+-+-+-+-+-+-+-+-+-+-+-+-+-+-+-+-+-+-+-+-+-+-+-+-+
|     TYPE      |       BSR IP ADDRESS      ...                   |
+-+-+-+-+-+-+-+-+-+-+-+-+-+-+-+-+-+-+-+-+-+-+-+-+-+-+-+-+-+-+-+-+-+
| BSR IP ADDRESS |
+-+-+-+-+-+-+-+-+
```

- TYPE: TBD
- BSR IP ADDRESS: THE IP ADDRESS OF THE BSR. THE IP ADDRESS INDICATES WHICH BSR IS SERVING THE MOBILE NODE. THIS ADDRESS IS USED TO FORWARD THE MOBILE IP REGISTRATION REPLY TO THE BSR SERVING THE MOBILE NODE. THE BSR EXTENSION MUST BE APPENDED AT THE END OF THE MOBILE IP REGISTRATION REQUEST.

FORMAT USED FOR THE BSR EXTENSION

FIG. 2

- USAGE: THE EXTENSION IS APPENDED AFTER THE HOME AGENT'S REGISTRATION REPLY AND CONTAINS THE MULTICAST ADDRESS ALLOCATED FOR THE MOBILE NODE.

```
 0                   1                   2                   3
 0 1 2 3 4 5 6 7 8 9 0 1 2 3 4 5 6 7 8 9 0 1 2 3 4 5 6 7 8 9 0 1 2
+-+-+-+-+-+-+-+-+-+-+-+-+-+-+-+-+-+-+-+-+-+-+-+-+-+-+-+-+-+-+-+-+-+
|     TYPE      |   MULTICAST          ...                        |
+-+-+-+-+-+-+-+-+-+-+-+-+-+-+-+-+-+-+-+-+-+-+-+-+-+-+-+-+-+-+-+-+-+
| ... ADDRESS   |
+-+-+-+-+-+-+-+-+
```

- TYPE: TBD
- MULTICAST ADDRESS: THE MULTICAST ADDRESS ASSIGNED FOR THE MOBILE NODE. THE INFORMATION RELATED TO THE MOBILE IS INCLUDED IN THE MOBILE IP REGISTRATION REPLY. THE MULTICAST ADDRESS EXTENSION MUST BE APPENDED AT THE END OF THE MOBILE IP REGISTRATION REPLY.

FORMAT USED FOR THE MULTICAST ADDRESS EXTENSION

FIG. 3

- USAGE: THE MESSAGE IS SENT BY ONE BSR TO ITS SURROUNDING BSRs TO INFORM THEM WITH THE LIST OF MOBILE NODE CURRENTLY LOCATED UNDER ITS BSR COVERAGE AREA. THE MESSAGE IS SENT PERIODICALLY.

```
 0                   1                   2                   3
 0 1 2 3 4 5 6 7 8 9 0 1 2 3 4 5 6 7 8 9 0 1 2 3 4 5 6 7 8 9 0 1 2
+-+-+-+-+-+-+-+-+-+-+-+-+-+-+-+-+-+-+-+-+-+-+-+-+-+-+-+-+-+-+-+-+
|     TYPE    |   RESERVED    |            LENGTH              |
+-+-+-+-+-+-+-+-+-+-+-+-+-+-+-+-+-+-+-+-+-+-+-+-+-+-+-+-+-+-+-+-+
|            LENGTH OF ONE LINK-LAYER ITEM                     |
+-+-+-+-+-+-+-+-+-+-+-+-+-+-+-+-+-+-+-+-+-+-+-+-+-+-+-+-+-+-+-+-+
|              MOBILE NODE HOME ADDRESS 1                      |
+-+-+-+-+-+-+-+-+-+-+-+-+-+-+-+-+-+-+-+-+-+-+-+-+-+-+-+-+-+-+-+-+
|              MOBILE MULTICAST ADDRESS 1                      |
+-+-+-+-+-+-+-+-+-+-+-+-+-+-+-+-+-+-+-+-+-+-+-+-+-+-+-+-+-+-+-+-+
|        MOBILE NODE LINK-LAYER SPECIFIC INFORMATION 1         |
+-+-+-+-+-+-+-+-+-+-+-+-+-+-+-+-+-+-+-+-+-+-+-+-+-+-+-+-+-+-+-+-+
                           ... ...
+-+-+-+-+-+-+-+-+-+-+-+-+-+-+-+-+-+-+-+-+-+-+-+-+-+-+-+-+-+-+-+-+
|              MOBILE NODE HOME ADDRESS n                      |
+-+-+-+-+-+-+-+-+-+-+-+-+-+-+-+-+-+-+-+-+-+-+-+-+-+-+-+-+-+-+-+-+
|              MOBILE MULTICAST ADDRESS n                      |
+-+-+-+-+-+-+-+-+-+-+-+-+-+-+-+-+-+-+-+-+-+-+-+-+-+-+-+-+-+-+-+-+
|        MOBILE NODE LINK-LAYER SPECIFIC INFORMATION n         |
+-+-+-+-+-+-+-+-+-+-+-+-+-+-+-+-+-+-+-+-+-+-+-+-+-+-+-+-+-+-+-+-+
```

- TYPE: TDB
- LENGTH: N, WHERE N IS THE VALUE OF TRIPLETS (MOBILE NODE HOME ADDRESS, MULTICAST ADDRESS AND LINK-LAYER SPECIFIC INFORMATION) PRESENT IN THE MESSAGE. CAN POTENTIALLY BE ZERO, TO DELETE OF THE ENTRIES IN THE SURROUNDING CACHES.
- MOBILE NODE HOME ADDRESS: THE IP ADDRESS OF THE MOBILE NODE.
- MULTICAST ADDRESS: THE MULTICAST ADDRESS ALLOCATED BY THE MAR FOR THIS SPECIFIC MOBILE NODE.
- MOBILE NODE LINK-LAYER INFORMATION: CONTAINS THE LINK-LAYER SPECIFIC INFORMATION FOR THE MOBILE NODE (e.g. THE MAC ADDRESS IF THE NETWORK PHYSICAL LAYER IS 802.11).

FORMAT USED FOR THE NEIGHBOR UPDATE EXTENSION

FIG. 4

FLOW CHART OF THE STEPS INVOLVED IN
REGISTERING A MOBILE IN A FOREIGN DOMAIN

TUNNELS ROUTING A PACKET
THROUGH A FOREIGN NETWORK

TUNNEL ROUTING A PACKET
THROUGH A HOME NETWORK

FLOW CHART OF THE STEPS INVOLVED IN
REGISTERING A MOBILE IN A HOME DOMAIN

MICROMOBILITY USING MULTICAST

FIELD OF INVENTION

This invention is related to the field of wireless communication (e.g., cellular networks). More specifically, it relates to registering mobiles and routing packets to and from mobiles in both home and foreign domains.

BACKGROUND OF INVENTION

The Internet has revolutionized the way society does its day-to-day chores. Such day-to-day chores include reading our daily morning papers, trading stocks, keeping track of weather, buying clothes, etc. Furthermore, the technology of wireless communications continues to improve. Wireless communications transitioned from analog radio systems to digital systems back in the sixties and now offers broadband access. Furthermore, because of the Internet (along with associated Internet applications) the wireless networking revolution will continue its rapid growth.

Mobile IP [RFC2002]; IP *mobility support*, Charles Perkins (Editor), RFC 2002, October 1996, hereby incorporated by reference, provides a framework wherein mobile nodes (or mobile hosts or mobiles) can move from one point of attachment (e.g. a sub network in an enterprise) to another point of attachment (e.g. another sub-network in another enterprise) and still be able to communicate with other nodes. The reason mobile IP can do this is because it provides the means to keep track of the current location (called a binding in the Mobile IP specification [RFC2002], and have all the traffic forwarded to the mobile node's current location transparently. Whenever the mobile node moves from one sub-network to another, its location is updated by updating the tracking (i.e. the binding) which is maintained in its home network (e.g. the network in which the user is officially registered).

However, updated tracking comes at a cost. Overhead, in the form of handoffs, is incurred when updating the tracking. Everytime a mobile host performs a handoff in a foreign network, Mobile IP Registration Request and Response messages are exchanged between the mobile host and the home agent.

One solution to the problem of frequent registration request messages being sent to the home agent is to take advantage of the domain concept and the topology of the domain (usually Tree-like). (A domain refers to a collection of base stations and routers under a unique administrative authority). Domains can be arranged in a hierarchical or tree-like manner. A root system is connected to successively lower levels of systems or servers). The base stations in cellular networks are usually clustered together with routers in the upstream to form domains that determine that determine where packets are forwarded.

Several protocols, such as HAWAII [Lucent], Cellular IP [Ericsson], and Hierarchical Foreign Agent, have been proposed to decrease the amount of messages sent to the home agent (HA). Each of these protocols uses the domain concept to reduce the number of messages sent. The HAWAII and Cellular IP proposals are very similar, but HAWAII has greater appeal because it offers a more complete solution to the above stated problem. An overview of the design of the protocols used in each is given below. Brief descriptions of the proposals from Singapore University and Hierarchical Micro-mobility Management are also given.

1.1 Handoff Aware Wireless Access Internet Infrastructure [HAWAII]

Some of the features of HAWAII include:

Defined two-level hierarchy along domain boundaries and defined separate mechanisms for inter-domain and intra-domain mobility. A unique co-located care-of-address is assigned to the mobile host to provide for QoS support.

Special paths are established to maintain end-to-end connectivity as the mobile host moves. These paths are used to provide a hop-by-hop routing of packets in the domain.

Soft-state mechanisms are used to provide a degree of tolerance to router or link failures within the network.

Depending upon the capability of the mobile host (i.e., the wireless technology used by the mobile node), two different schemes for smooth handoffs are provided. First, a non-forwarding scheme for mobile nodes is used that can receive data simultaneously from two different base stations. Second, a forwarding scheme for nodes is used that can receive data from only one base station at a time.

1.1.1 Terminology Used in HAWAII

Home Domain: This is the domain to which a mobile node belongs.

Foreign Domain: Any domain that the mobile node visits that is not its home domain.

Domain Root Router (DRR): This is the gateway to a domain.

Update Messages: These are messages sent by the base station to the routers upstream to update the entries of a mobile node periodically (using a lifetime) or when a handoff occurs.

1.1.2 Principles

The gateway into each domain is called the domain root router. Each mobile host has an IP address and a home domain. A domain may cover an area containing a few hundred base-stations, thereby increasing the probability that the mobile host remains in the same domain as it moves around. Maintaining the mobile host within the home domain reduces greatly the home agent's job.

When a mobile node (MN) moves into a foreign domain, the usual mobile IP concepts come into play. Each mobile host is assigned a unique co-located care-of-address and the address is unchanged when moving within the foreign domain. The home agent (HA) tunnels the packets to the co-located care-of-address. (Tunneling is the technique by which datagrams are sent into the payload of a protocol of the same layer (e.g., IP layer). For example, tunneling occurs when an IP packet is put into another IP packet). The home agent is not notified of movements within the foreign domain and connectivity is maintained using dynamically established paths in the foreign domain.

1.1.2.1 Sequence of Operations—Power Up

The base station determines if the MN is at home or in a foreign domain by comparing the network access identifier (NAI) sent along with the registration request with the NAI of the current wireless domain. See *The Network Access Identifier*, B. Aboba, Microsoft Corporation, M. Beadles, WorldCom Advanced Networks, RFC 2486, January 1999, hereby incorporated by reference. If the mobile is at home, the base station creates a route entry in every node up to the domain root router. On the other hand, if the mobile is in a foreign domain, the base station must forward the registration request to the home agent and create a route entry in every node up to the domain root router.

Packets from a correspondent node (CN) are sent to the home network of the MN.

The packets are intercepted by the HA and then tunneled to the MN using the co-located care-of address (CCOA). When the packets reach the wireless domain they are routed using the hop-by-hop route entries previously created.

1.1.2.2 Sequence of Operations—Intra-Domain Handoff (Non-Forwarding Scheme)

Upon receiving a registration request from a MN, the base station (BS) determines the old BS IP address that the MN has moved out of as the MN sends the previous foreign agent node extension (PFANE), which includes the old BS address, along with the new registration request to the BS.

If the movement was an intra-domain movement, then the BS sends a Hawaii update message to the old BS, updating the cache of all the routers in the path between the new BS and the old BS.

The old BS then sends an acknowledgement back to the new BS.

The Above Operations Provide for Smooth-handoffs.

1.1.3 Sequence of Operations—Data Flow

Packets sent by the CN are sent to the MN's home network, the HA intercepts these packets and tunnels them to the CCOA. The DRR then sends the packets downstream through the appropriate interface on a hop-by-hop basis.

The crossover router then forwards the packets to the next hop router through the interface per the HAWAII entry.

1.2 Cellular IP [CIP]

Cellular IP allows the routing of IP datagrams to a mobile host. The cellular IP protocol, along with mobile IP, is intended to provide wide-area mobility support. Cellular IP has been designed for use on a local level, like in a campus or metropolitan area network.

1.2.1 Terminology

Cellular IP Node (CIP): A cellular IP network consists of interconnected Cellular IP (CIP) nodes. The nodes route packets inside the Cellular IP network and communicate via a wireless interface with mobile hosts.

Gateway Controller: The gateway controller (GC) receives packets (usually update packets) that are used by the gateway to update the locations of the MN and are then dropped.

Gateway Packet Filter: The gateway packet filter (GPF) checks to see if packets coming from within the domain are sent to the GC or forwarded on to the internet.

Cellular IP Gateway: A cellular IP gateway consists of a GC, CIP Node and GPF.

Control Packet: A control packet is used as a route-update and paging-update packet.

Paging Cache: Some Cellular IP nodes maintain a paging cache. It is used to route packets to an idle mobile node.

Routing Cache: All CIP nodes must have a routing cache and it is used for routing packets to an active mobile node.

1.3 Location Management and Routing

CIP uses two parallel cache systems to store information related to the location of mobile hosts, a routing-cache and a paging-cache. Mappings for active hosts are maintained in the routing-cache, which has a smaller timeout value than paging cache. For a host that performs handoffs frequently, the mappings are maintained at the routing-cache. Since the time-out values of the routing-cache are very small, the entry for a mobile from the routing cache of a node is flushed frequently. Consequently, packets are not sent to the mobile host's old address resulting in less waste of resources. An idle host sends fewer update packets as these packets are only sent when the mobile node enters a new paging area before the expiration of the paging timer.

1.4 Cellular IP Functions

The following is a discussion of some of the features found in Cellular IP.

1.4.1 Location Management

Paging update packets are sent by idle hosts to update the paging-cache mappings. They reflect the current location (paging area), but do not modify the routing-cache mappings. Paging update packets are discarded once they reach the gateway to prevent Cellular IP specific control operations from reaching the internet. When an IP packet arrives at a cellular node that is addressed to a mobile host for which no up-to-date routing cache mapping is available, then the mapping in the paging-cache is used to route the packet. This phase is called "Implicit Paging."

1.4.2 Routing

Packets transmitted by mobile hosts are routed to the gateway using regular hop-by-hop routing. The cellular IP nodes monitor these packets and update their routing-cache entries with the host address and the interface on which the packets arrived. Packets addressed to the mobile host are routed hop-by-hop in the reverse by the routing cache mappings. Mobile hosts that are active, but do not have any data to send, must send periodic route-update packets in order to ensure that route-caches are not purged. For reliability, paging caches may also contain mobile hosts that are also contained by the routing caches.

1.4.3 Handoff

The mobile host initiates handoffs. When a mobile host migrates or moves, packets are directed to the new base station. As a packet travels, it updates the caches along its path to the gateway. If there are nodes that share both the old and the new paths, then the old mappings are refreshed. Packets are sent to the old base stations and to the new base station for a time period equal to the timeout of the route-cache mappings. After the expiration of the timeout, the cache entries for the old base stations are cleared.

1.4.4 Wide-Area Mobility

Wide area mobility occurs when a mobile host moves from one Cellular IP network to another. The mobile nodes distinguish between Cellular IP networks by using the Cellular IP network identifier contained in the base station's beacon signals. The beacon signal also contains the IP address of the gateway. A mobile host can start sending paging-update packets immediately. Upon receiving the first paging-update packet, the gateway performs admission control that could involve charging decisions, etc. Once the request has been accepted, the mobile host sends a mobile IP registration message to its home agent specifying the gateway's IP address as the care-of address.

1.5 Proposal from Singapore University

This scheme has two features. First, it uses hierarchical mobility management architecture to restrict handoff processing within the domain. Second, it uses multicast as a mechanism to deliver packets to multiple base stations to achieve fast handoffs.

1.5.1 Terminology

Domain Foreign Agent (DFA): the DFA operates like a gateway into the domain. The DFA performs all functionality as mentioned in Mobile IP RFC2002, IP *mobility support*, Charles Perkins (Editor), RFC 2002, October 1996.

Dynamic Virtual Macro-cells (DVMs): The base stations are logically organized into DVMs. Clusters of base stations adjacent to each other form the DVMs. In fact, they may even overlap. Each BS may belong to multiple DVMs, but each BS can be the core of only one DVM.

1.5.2 Principles

The MN registers using the IP address of the DFA, which is broadcast on behalf of the DFA by the BS. The DFA then assigns a multicast address unique within it domain for the MN. The MN informs the serving BS to subscribe to this multicast address. In addition, the BS tells its neighboring BSs to subscribe to this multicast group. Packets destined to a MN within a domain are tunneled to the DFA. The DFA then forwards the packets to the multicast address of the MN. BSs subscribed to the multicast group receive the datagrams. Only the BS that serves the MN forwards the packet, while other BSs just buffer them.

Disadvantages

On disadvantage in using the proposal from Singapore is that there is a latency incurred during handoff in the determination of the core router, which is the multicast router serving all the base stations.

1.6 Hierarchical Micro Mobility [UHMM99, Toward a Unified Hierarchical Mobility Management Framework, Claude Castelluccia, Lubovic Bellier, Institut National de Recherche en Informatique et en Automatique, draft castelluccia-uhmm-framework-00.txt, work in progress]

1.6.1 Terminology

In this proposed micro mobility scheme, the mobility management protocol is composed of three components:

Access Mobility Management Protocol: It specifies the registration procedures between the MN and the domain the MN is attached to. In addition, it operates independently of the micro and macro-mobility management protocols used in the core of the network.

Micro-mobility Management Protocol: It handles local mobility within the domain.

Macro-mobility Management Protocol: It handles macro-mobility (inter-domain) of the MN; The Mobile IP is used to achieve macro-mobility.

1.6.2 Principles

The proposal is based on the deployment of mobility supports (MS). A MS is a router or set of routers that maintains a binding for mobile nodes currently visiting the domain. In addition, they send binding updates on behalf of the MN. The functions of a MS include:

Processing registration messages sent by the MN.

Sending binding updates to the CN and the HA of the MN.

Intercepting and redirecting packets addressed to the MN.

1.6.3 Sequence of Operations: Entering a New Domain (Inter-domain Movement)

Obtains a Care-of Address (CoA) (also called Physical CoA (PcoA)) and registers with the mobility support (MS), by sending its home address, home agent address, PcoA and the address of its previous mobility support (MS_p) in the previous domain. The registration is acknowledged by the mobility support.

Upon receiving a registration message from the MN, the MS allocates a Virtual CoA (VCoA) for the MN and registers with its HA on behalf of the MN. It then acknowledges the reception of the registration message sent by the MN. The acknowledgement contains the VCoA.

After the above-mentioned operations, the MS asks the MS_p to redirect all packets addressed to the MN to it. MS_p must acknowledge this request and send the list of CNs and the list of sequence numbers of the latest binding updates sent.

Creates an entry that contains binding between the MN's address, its HA, VCoA and the list of CNs and sequence numbers.

Sends a binding update to each CN.

MS then creates a binding between the MN's PCoA and VCoA, which is used by the MS to redirect packets addressed to its current point of attachment.

1.6.4 Sequence of Operations: Intra-domain Movement

When a MN moves within a domain (from the coverage of one BS to another), then the MN registers its new point of attachment with the MS. The MS then updates the binding entry for the MN replacing the existing PCoA with the new PCoA. It may also send binding updates to the MN's local CN's.

1.6.5 Data Flow

Datagrams sent by a CN are intercepted by the MN's HA and forwarded to the MN's VCoA. The MS intercepts these packets and tunnels them to the PCoA. The MS sends a (Home Address, Border Router) bind update message to each of the CNs. The CNs, upon receiving these messages, update the MN's entry and sends the forthcoming packets to the MN's current PcoA.

1.7 Multicasting Based Architecture for Internet Host Mobility [Multi97]

This proposal uses IP multicasting as a mechanism to achieve mobility. Every mobile node is issued a multicast address instead of a unicast address. There is no concept of Home Agent/Foreign Agent. Instead, the multicast address is used along with location servers and multicast routers to achieve mobility. It is not a solution to the problem of micro-mobility. Instead, it is protocol that challenges Mobile IP.

1.7.1 Terminology

Location Server (Distributed Directory): These are servers that store bindings between the multicast address of a MN and the multicast router serving the MN. Each MN is responsible for periodically updating its location server with information on the multicast router (MR) serving it.

Base Station: In addition to the normal capabilities of a base station, each base station has the capability of working as a MR

1.7.2 Principles

When a CN sends datagrams intended for a MN (having a multicast address), the multicast router for the correspondent node (MR_CN) within the network picks up the datagrams and checks a location server for information regarding the MN. The location server chosen depends upon the multicast address of the MN. Upon obtaining the address of the multicast router (MR_MN) that serves the MN, the MR_CN contacts the MR_MN and joins the multicast group and forwards the datagrams. Each MR that receives the datagrams de-tunnels the datagrams and forwards them to the MN. Before the MN moves from the coverage of one multicast router to another, the MN requests the MR within the new network to join the multicast group. As a result, the MN receives an uninterrupted flow of packets uninterrupted. Therefore, both the previous MR and the new MR of the MN receives the packets, but the previous MR will stop receiving datagrams after a certain time period.

The protocols previously discussed in this document have some drawbacks.

Cellular IP implies that the mobile node implements that protocol. This is major drawback since it requires an update from every node to take advantage of the protocol. Another drawback is that the protocol does not detail how the mobile node determines whether it uses a traditional scheme (i.e. mobile IP) or the cellular scheme.

Both Cellular IP and HAWAII use a hop-by-hop routing protocol. As a result, both protocols may require management of huge routing tables when deployed in a big network (e.g. some cellular networks use millions of users). This implies also that all nodes in the wireless domain must be integrated with a specific software. Therefore, off the shelf components can not be used.

HAWAII does not support the foreign address care-of address scheme offered in mobile IP. Instead, HAWAII requires usage of co-located care-of address. Co-located care-of address requires the operator to manage a huge number of IP addresses, since it must allocate one IP address per user. Considering that IPv4 already has a lack of address, this proposal also implies that the network either run a private address scheme or use IPv6.

The Singapore proposal implies that the mobile node sends the multicast address along with the registration request to the new base station. This modifies the protocol with every single mobile node.

The unified hierarchical model implies that the mobility support registers on the mobile node's behalf with the home agent. This scheme creates a serious security issue. It also modifies the mobile IP specification by changing the registration PDU. Finally, the mobile node needs to have the IP address of the base station with which it was previously connected.

The solutions aforementioned do not support a scheme such as "make before break", which is essential for voice over IP applications.

Multi97 has several drawbacks. There is a limitation in the number of unique class D addresses that can be assigned to each and every MN in IPv4. Also, it requires that every router in a sub-network is mobility-aware. Before a MN moves under a new coverage, it can inform the MR within that area of a possible handoff and request the MR to join the multicast group. Therefore, the MN has to know the address of the neighboring MR. Also, there is overhead that is involved at the MN every time it performs a handoff. In addition, the scalability of using a location server is something that is not very clear.

SUMMARY OF THE INVENTION

In a preferred embodiment, the invention is a method and apparatus for registering a mobile node in both home and in foreign domains using the following methodology. A base station informs a base station router of the presence of a mobile (or mobile node or mobile host) entering the base station's coverage area by sending a mobile node advertisement message to a base station router. If the mobile node is unknown to the base station router (i.e., mobile node not present in the base station router's binding or probable caches), the base station router sends an agent advertisement to the mobile. In addition, the mobile node sends a mobile IP registration request to the base station router. Then, the base station router appends a base station router extension message to the mobile IP registration request (which contains an IP address of the base station router) and forwards the mobile IP registration request to a main access router. Next, a home agent serving the mobile host is asked to grant or deny the mobile IP registration request. The home agent then replies.

In another preferred embodiment, the main access router appends a multicast address extension to the mobile IP registration reply. The multicast address extension contains the multicast address allocated for the mobile node. This address is unique in the domain.

In still another preferred embodiment, the base station router sends a neighbor update message to other base station routers. The neighbor update message contains a list of mobile nodes currently located under the base station router's coverage area.

In yet still another preferred embodiment, the invention is a method and apparatus for sending packets to a mobile node in a foreign domain, comprising the steps of sending at least one packet to the home network. The home agent tunnels the packet to a main access router. The main access router detunnels the packet, creates another tunnel and forwards the packet to a diffusion (or multicast) group where a base station router detunnels the packet and forwards it to the mobile node. Furthermore, the neighboring base station routers not currently serving the mobile node filter and discard the packet. A neighboring base station router is a base station router that has an entry for the mobile node in its probable cache.

In yet still another preferred embodiment, the invention is a method and apparatus for sending packets to a mobile node in a home domain, comprising the steps of sending at least one packet to a mobile node address by tunneling the packet to a main access router and forwarding the packet to a multicast group where a base station router detunnels the packet and forwards it to the mobile node. Furthermore, the neighboring base station routers not currently serving the mobile node filter and discard the packet. A neighboring base station router is a base station router that has an entry for the mobile node in its probable cache.

BRIEF DESCRIPTION OF THE DRAWINGS

FIG. 1 is the format used for the mobile node advertisement message.

FIG. 2 is the format used for the BSR extension.

FIG. 3 is the format used for the multicast address extension.

FIG. 4 is the format used for the neighbor update extension (or neighbor update message).

DETAILED DESCRIPTION OF THE INVENTION

Figure 5:
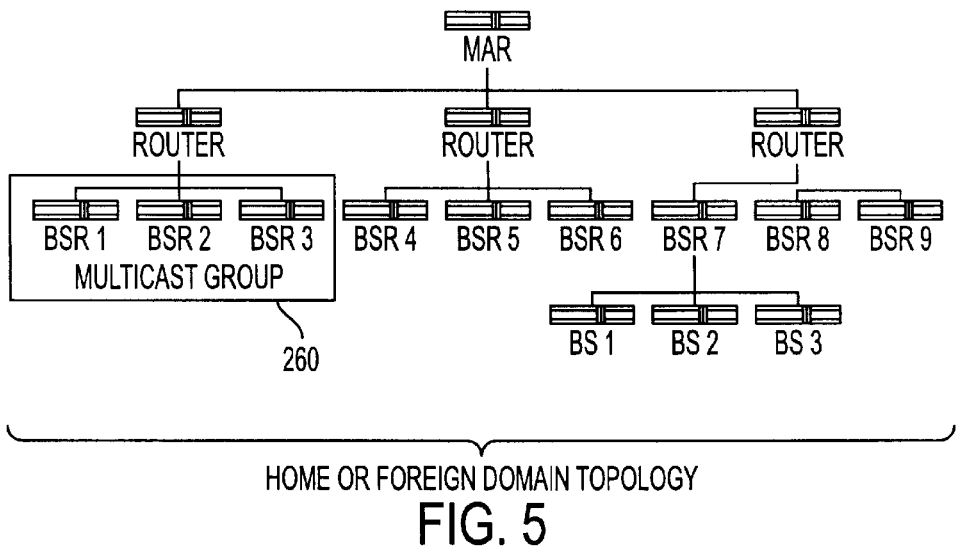
FIG. 5 is the home or foreign domain topology.

The present invention does not require any modification to the mobile node. In fact, the micro-mobility scheme is completely transparent for the mobile node. The mobile node implements the mobile IP. Furthermore, the present invention works with off the shelf components, which can be deployed in the network. However, these network elements must support multicast routing.

Components that require specific software include the base station router (BSR) 220 and the main access router or access router (MAR) 230. In addition, the present invention can support a "make before break scheme." This scheme is used in the Global System for Mobile Communication (GSM) networks. Under the "make before break scheme," a new circuit (or path) to the mobile is created before breaking the old one. This principle is useful for voice communication. Having such a feature is an advantage over existing systems.

A Short Description of the Present Invention Follows 1.8 Terminology

Wireless domain (WD): The domain by which the user gains access to the Internet. The domain is managed by a single entity for security and authorization reasons.

Main access router (MAR): The router connected to a wireless domain and to the Internet. This router supports mobile IP.

Base station router (BSR): The router connected to a set of bridges of base stations.

BSR coverage area: The BSR coverage area is composed of every coverage area of each base station attached to the BSR.

Serving BSR: This is the BSR that is currently processing the multicast packet sent to a mobile node. The BSR de-tunnels the outer header and forwards the inner packet to the mobile node.

Base station (BS): This is the end point of the wired network. It has an air interface. Several base stations may be linked to the same BSR.

BS coverage area: The area covered by a single base station.

Active cache or (binding cache): This cache (or memory) contains data or information related to every mobile node located under the coverage area of the BSR.

BSR probable cache: This cache contains data or information sent by surrounding BSRs indicating that a mobile node has been authorized to use the wireless infrastructure. The entry within a BSR's probable cache also indicates that the mobile node has a good chance of moving into the coverage area of the BSR.

Cell: It is the area covered by a base station.

1.9 New Mobile IP Extensions

The following are definitions of novel extensions to the Mobile IP used to implement the present invention.

1.9.1 Mobile Node Advertisement Message

FIG. 1 is the format used for the mobile node advertisement message. A base station (BS) 210 sends this message to its BSR 220 whenever the BS 210 discovers that a new mobile (or mobile node) 200 has entered its coverage area. The message is also sent periodically to refresh binding cache 224 entries in the BSR 220. In this case the message includes a list of link layer information of all the mobile nodes currently attached to the base station.

1.9.2 BSR Extension

FIG. 2 is the format used for the BSR extension. The extension is appended to the mobile node's registration request and contains the IP address of the BSR 220 forwarding the mobile node's registration request.

1.9.3 Multicast Address Extension

FIG. 3 is the format used for the multicast address extension. This extension is appended to the home agent's 240 registration reply and contains the multicast address allocated for the mobile node.

1.9.4 Neighbor Update Extension

FIG. 4 is the format used for the neighbor update extension (or neighbor update message). This message is sent by one BSR 220 to its surrounding BSRs 220. It contains a list of mobile nodes currently located under its BSR 220 coverage area. This message can be sent periodically.

1.10 Method Overview

In this section, the behavior of a mobile node 200 in two situations is described. First, the behavior of the mobile node 200 when it enters a foreign domain (or foreign network) 300 and moves within its coverage area is described. Second, the behavior of the mobile node 200 while it moves within the coverage area of the home network (or home domain) 340 is described. For both cases, the topology shown in FIG. 5 is used.

The main access router (MAR) 230 uses mobile IP RFC2002, IP *mobility support*, Charles Perkins (Editor), RFC 2002, October 1996, when implementing both foreign and home agent functionality. The MAR 230 also implements part of the protocol extensions described infra. For example, the MAR 230 processes the BSR extension (or router extension) that follows every registration request (i.e., mobile IP registration request). In addition, the MAR 230 allocates and inserts the multicast address extension (or multicast extension) before forwarding the registration reply.

Routers within the wireless domain support IP multicast routing. In addition, the base station routers (BSR) 220 implement the extensions described in this document. For example, the BSR 220 inserts the BSR extension after each registration request made by a mobile (i.e., mobile IP registration request or registration request). Furthermore, the BSR 220 processes the multicast address extension following the mobile registration reply. In addition, the BSR periodically sends a neighbor binding update (or update message) to every BSR surrounding it. (In a preferred embodiment, the neighbor binding update is sent at least once a minute). This update is used by neighboring BSRs to manage their own probable cache (or second cache) 222. The probable cache 222 lists the mobile nodes 200 that are located within the vicinity of the BSR 220.

As mentioned earlier, in a preferred embodiment the topology is known by the BSRs 220. Therefore, each BSR 220 knows the IP address of other BSRs 220 that are located in its neighborhood. For instance, BSR 4 knows the IP addresses of BSR 3 and BSR 5 because these BSRs are its neighbors. In addition, each base station router 220 knows the IP address of its main access router 230.

The method used in the present invention extends the current Mobile IP protocol with a set of messages designed to:

Allow a first BSR 220 to communicate to other BSRs 220 surrounding it (i.e., next probable BSRs 220) a list of the mobile nodes' that are currently located under that first BSR's 220 coverage area. (By probable, it is meant that the mobile will probably move into one or more of those BSR's 220 coverage area). This message is called the neighbor binding update extension (or neighbor update extension or neighbor update message or update message) (i.e. the mobile moves from one BSR 220 to another). This message is sent from BSR 220 to BSR 220.

Allow a BSR 220 to send to its MAR 230 the IP address of the BSR 220 that has forwarded the mobile IP registration request. This message is called the BSR extension. This message is appended to the mobile IP registration request.

Allow a MAR 230 to inform the BSR 220 of the multicast address assigned to this particular mobile node 200 when access to the network is granted. This message is called the multicast address extension. This message is appended to the mobile IP registration reply.

Allow a BS 210 to send to the BSR 230 the layer characteristics of a mobile node entering one of the cells. This message is called the mobile node advertisement extension (or mobile node advertisement message or advertisement message). The message may contain information concerning more than one mobile node 200.

The following is a description detailing how these extensions contribute in extending mobile IP to offer micromobility support. The first case illustrated is when the mobile node 200 is moving under the coverage area of a foreign domain (or foreign network) 300. (A foreign network is a network to which the mobile is attached to when not attached to the home network and on which the care-of address is reachable from the rest of the internet). The second case illustrated is when the mobile node 200 moves within its home domain (or home network) 340 in which the mobile 200 manages to return to its home agent. (A home network is a network at which the mobile node appears reachable to the rest of the internet because of its assigned IP address). A home agent is a node on the home network at which the mobile node seems reachable at its home address, even when the mobile node is not attached to its home network). It is assumed that there is a single operator managing the foreign network (or foreign domain) 300.

1.10.1 Entering the Foreign Domain

Figure 6:
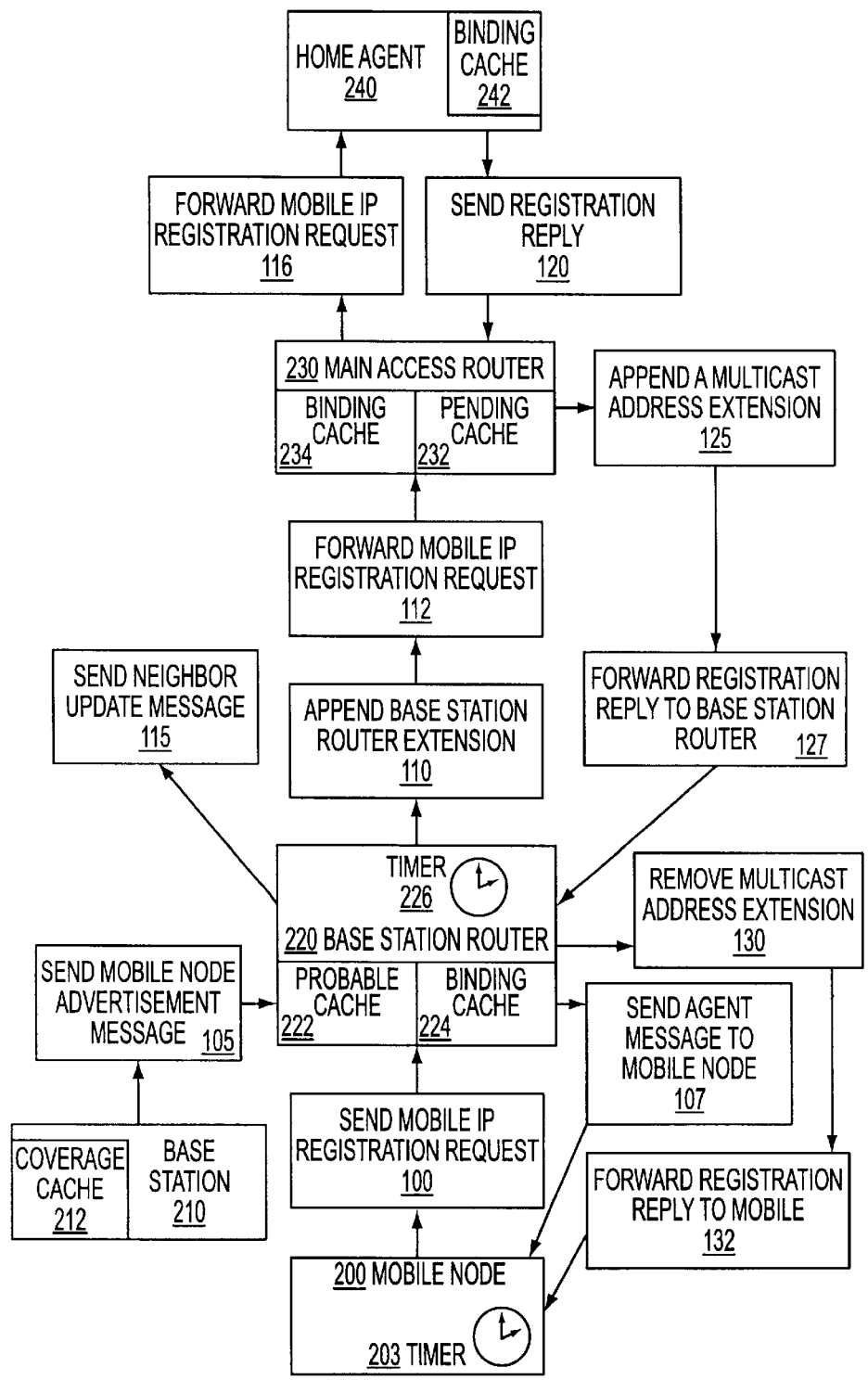
FIG. 6 is a flowchart of the steps involved in registering a mobile in a foreign domain.

When entering a foreign domain 300 (see FIG. 6), a mobile node 200 registers its location. (Registration is the process by which the mobile node informs the home agent about its current care-of address). When a mobile node 200 enters the coverage area of a base station router 1 (or any other router in this domain), the link layer protocol at the base station (BS) 210 serving the mobile node 200 triggers the emission of the mobile node advertisement message. The BS 210 uses the mobile node advertisement message to inform its BSR 220 of the entrance of a mobile node 200 in the cell. In a preferred embodiment, the base station 210 periodically sends the mobile node advertisement message to the BSR 220 with a list of mobile nodes 200 located in the base station cell. (In a preferred embodiment, the mobile node advertisement message is sent no more than once per second).

The BSR 220 will act on the presence of the link layer information of the mobile node 200 in its caches. If the binding cache (or first cache) 224 has a hit (i.e., the mobile is already entered in the binding cache 224), the BSR 220 refreshes the entry. If the probable cache 222 has a hit (i.e., the mobile 200 is already entered in the probable cache 222), the BSR 220 sends a joint request (e.g., an IGMP unsolicited membership report disclosed in RFC 2236: *Internet Group Management Protocol*, Version 2, W. Fenner, Xerox Parc, RFC 2236, November 1997, hereby incorporated by reference) to join the multicast group and transfers the entry from the probable cache 222 to the binding cache 224. In addition, the BSR 220 periodically sends a neighbor binding update to its surrounding BSRs 220. The neighbor binding update contains a list of link layer information of all the mobile nodes 200 located in its coverage area. If none of the caches have a hit, the BSR 220 sends a mobile IP agent advertisement message (or agent message) to the mobile node 200.

The mobile node 200 sends a mobile node registration request (or mobile IP registration request) to the base station router 220. The BSR 220 (which can be for instance BSR 1) adds its IP address (i.e. BSR extension) to the mobile node registration request and forwards it to its MAR 230. The MAR 230, after having performed all the required checks necessary for granting the registration request (AAA protocol, challenge/response, and key exchange, NAI . . . ), forwards the registration request to the home agent 240.

In addition, the MAR 230 creates an entry in the pending cache 232 for the mobile node registration request which includes the IP address of the BSR 220 serving the mobile node 200. To the home agent 240, the MAR 230 appears to host the mobile node 200 (or put another way, acts like a foreign agent). The home agent 240 replies, based on its policy, by granting or denying the registration request. If the home agent 240 grants the request, it sends its reply to the foreign agent (i.e. the MAR 230). (A foreign agent is an agent on the foreign network that assists the mobile in receiving datagrams delivered to the care-of address. See Charles E. Perkins, Mobile Networking Terminology, Charles E. Perkins, Internet-computing@computing.org, EEE Internet Computing Online 1997, hereby incorporated by reference.)

If the mobile node 200 initiates the first registration request and moves towards a new cell connected to a new BSR 220, the mechanism previously described will trigger a second registration request. The new BSR 220 processes the registration request as described in the previous paragraph (i.e. the BSR 220 appends the BSR extension to the registration request). Furthermore, the MAR 230 receiving the mobile node registration checks in its pending cache (or third cache) 232. If the cache has a hit, the MAR 230 will conclude that the mobile node has moved to another BSR's coverage area while the mobile node's home agent 240 processes the previous registration request. The MAR 230 then updates the pending cache 232 to reflect the new BSR address.

When the MAR 230 receives the registration reply, it updates its caches to reflect the result of the request (e.g. remove the entry in the pending cache 232 and creates an entry in the binding cache 234). Furthermore, it assigns a multicast address to the mobile node 200. Next, the registration reply is forwarded to the BSR 220 preceding the multicast address extension. BSR 1 removes the multicast address extension and forwards the registration reply to the mobile node 200. It also creates a binding entry associating the multicast address to the mobile node 200. (A binding is a plurality of numbers that contains the mobile node's home address, care-of address and registration lifetime).

BSR 1 periodically informs BSR 2 of the newly created bindings with a neighbor binding update message. The message includes for each mobile node found in the binding cache 224 the mobile node address, the care-of address, the home agent address, the multicast address, the link layer information and the lifetime of the registration. The neighbor binding update message refreshes the probable cache 222 entries. However, it is a partial refresh. The probable cache 222 will be entirely refreshed after the BSR 220 has received every neighbor binding update message from each of its neighboring BSRs 220.

If the mobile node 200 remains under the coverage area of the same base station 210, then the base station 210 periodically sends refresh messages (mobile node advertisements) to BSR 1. The mobile node advertisement message partially refreshes BSR 1's binding cache 224 entries. However, it is a partial refresh. The binding cache 224 will be entirely refreshed after BSR 1 has received a mobile node advertisement message from each of the base stations 210.

If the mobile node 200 moves to another base station 210 connected to the same BSR 220, the base station 210 immediately sends a mobile node advertisement message with the link layer information of the mobile node 200 that has generated the event.

If the mobile node moves to a cell that is connected to BSR 2, one of the BSs informs BSR 2 of the presence of the mobile node by sending a mobile node advertisement message to BSR 2. If BSR 2 has an entry in its probable cache containing the information sent by BSR 1, BSR 2 associates the link layer information given by the BS 210 to the one found in the probable cache 222 and sends a message in the direction of its MAR 230 to join the multicast group 260 to receive the packets of the mobile node. The BSR 2 transfers the mobile node's entry in the probable cache to the binding cache.

Meanwhile, since BSR 1 will not receive a mobile node advertisement message from at least one of its BSs 210 refreshing the binding cache entry of the mobile node 200 which has moved out of the coverage area of BSR 1 and into the coverage area of BSR 2, the entry for that mobile node 200 is moved in the probable cache 222.

If the mobile node 200 can receive and transmit via several base stations 210 the mobile node 200 will receive the same message from these base stations 210.

1.10.2 Care-of Address

The proposed protocol does not make any special requirement on the type of care-of address used by the mobile node 200. (A care-of address is an IP address at the mobile node's current point of attachment to the internet if the mobile node is not attached to its home domain). This address can either be a foreign agent care-of address or a co-located care-of address. (A collocated care-of address is a care-of address assigned to one of the mobile node's network interfaces, instead of one that is being offered by a foreign agent).

The MAR 230 initially requires all the BSRs 220 to set the 'R' bit in the agent advertisement message they send after receiving a mobile node advertisement message.

Beside this point, the principle remains unchanged. If the mobile node 200 registers with a co-located care-of address, the BSR 220 appends the BSR extension to the registration request. The MAR 230 processes the registration and removes the BSR extension. Next, the MAR 230 allocates a multicast address for the mobile node 200 and appends it using the multicast address extension to the registration reply. The only difference resides in the traffic management, i.e. which node removes the tunnel 280 and forwards the packet to its mobile destination. Section 1.10.3 describes how the traffic is managed when the mobile node 200 uses a co-located care-of address.

1.10.3 Traffic Flow 1.10.3.1 Foreign agent care-of address

Figure 7:
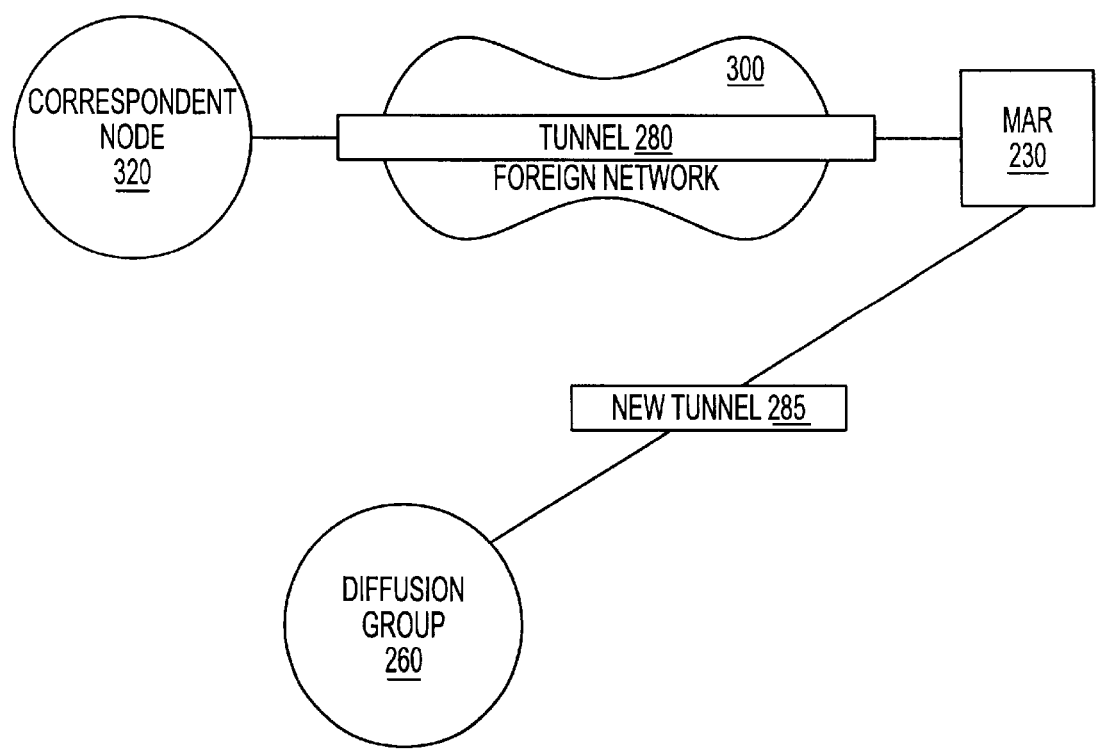
FIG. 7 shows tunnels routing a packet through a foreign network.
Figure 8:
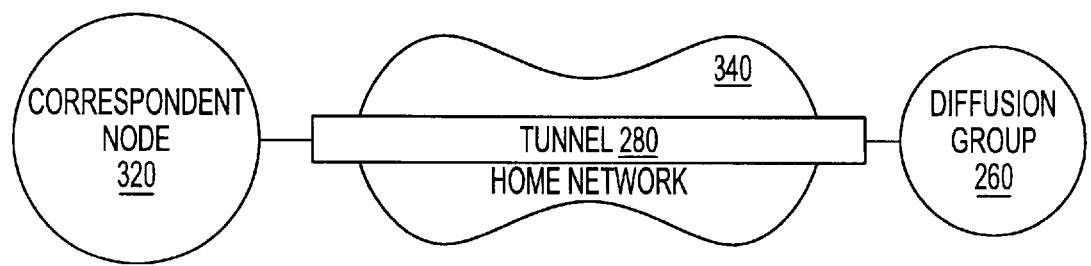
FIG. 8 shows a tunnel routing a packet through a home network.

In a preferred embodiment, packets addressed to a mobile node 200 in a foreign domain 300 from a correspondent node 320 located outside that same foreign domain 300 are routed in the following manner (see FIG. 7). If the correspondent node 320 is located outside the foreign wireless domain 300, packets send to a mobile node 200 will be addressed to the home network 340. The home agent 240 captures and tunnels those packets to the care of address of the mobile node 200 found in the home agent's binding cache 242. This address corresponds to the MAR's 230 IP address. The MAR 230 receives the tunneled packets. If the MAR 230 has a valid binding cache entry for the mobile node, it de-tunnels the packet and creates a new tunnel 285. The source IP address (or source address) is set with the IP address of the MAR 230 and the destination IP address (or destination address) is set with the multicast address assigned to the mobile node 200. The packets are then sent to the multicast group 260. Each BSR 220 that has subscribed to the multicast group 260 receives a copy and de-tunnels the packets and forwards the packets to the mobile node 200.

1.10.3.2 Co-located Care-of Address

If the mobile node 200 uses a co-located care-of address, the MAR 230 captures the datagram and tunnels them with the destination address set to the multicast address allocated for the mobile node 200. Each BSR that has subscribed to the multicast group 260 receives the packets and de-tunnels it and sends the packet to the mobile node 200. The mobile node 200 de-tunnels the packets as specified in mobile IP [RFC 2002].

1.10.3.3 Correspondent within the Same Wireless Domain

If the correspondent node 320 is located in the foreign domain 300, the traffic is sent to the mobile node's home address. The MAR 230 searches its binding cache (or fourth cache) 234 for a valid entry containing the mobile node's home address. If the cache 234 has a hit, the MAR 230 tunnels the packets directly to the multicast group (or diffusion group) 260. This mechanism enhances the performance of the overall network when route optimization is not used.

1.10.4 Moving within the Foreign Domain

One advantage of the present method is the low latency required before receiving packets on outgoing connections. That is, the time that the system needs to perform a handoff between two BSRs 220 is reduced. Under the present method, the base station 210 sends a mobile node advertisement message to the BSR 220 after it detects a new mobile node 200. The BSR 220, if it has an entry for the mobile already in its probable cache, will join a multicast group 260. Therefore, the latency is reduced compared to Mobile IP, which requires that the message be sent to the home agent 240. Because it relies on a link layer protocol, the present method allows such performance to be achieved.

If the mobile node 200 enters a new cell, the base station 210 informs the BSR 220 of the presence of the mobile node 200 by sending a mobile node advertisement message including the link layer information of the mobile node 200. If the mobile node 200 has moved to another base station 210, but remains under the coverage of the same BSR 220 (i.e. the mobile node is served by a BS 210 linked to the same BSR 220), then no action is needed. On the other hand, if the mobile node 200 is not among the ones served by the BSR 220 (i.e. the BSR 220 does not have a binding cache), but the BSR 220 has an entry in the probable cache 222, the BSR 220 immediately subscribes to the multicast group (or diffusion group) 260.

At the next expiration of the timer 226 for the emission on the neighbor binding update message, the BSR 220 sends all BSRs 220 in its neighborhood a list of mobile node information of each mobile node 200 within its coverage area.

1.10.5 Make Before Break Option

The "make before break" option requires that the surrounding BSRs 220 of a serving BSR 220 subscribe to the multicast group 260 as soon as they receive the neighbor update message. This option also requires that all the BSRs 220 not currently serving the mobile node 200 (i.e. the mobile node's entry is in their probable cache 222) to filter and discard all the incoming multicast packets. A BSR 220 stops filtering incoming multicast packets when the BSR 220 receives from one of its base stations 210 a mobile node advertisement message including the mobile node link layer information. This option is intended to reduce the latency of the multicast group 260 join message's processing, since the BSR 220 already receives the packets sent to the mobile 200. The processing is then limited to the removal of the filtering feature associated with this particular multicast address.

1.10.6 Refreshing the Registration

When the mobile node 200 determines that the previous registration is close to expiring, it sends a new mobile IP registration request to the its home agent 240. The BSR 220 currently serving the mobile node 200 then appends the BSR extension. Next, the MAR 230 updates its binding cache 224 to reflect the new lifetime of the binding. The multicast address remains unchanged.

1.10.7 Moving within the Home Domain

1.10.7.1 Virtual Home Network

When the mobile node 200 moves within the home wireless domain (or home network or home domain) 340, principles described for the foreign domain 300 remain in use. The mobile node home domain 340 is accessible through the various base stations which are connected to the MAR 230. Thus, the MAR acts as a virtual home agent 340 for the mobile node 200. As mentioned infra, in a preferred embodiment, the present method uses an initialization phase, during which the BSRs 220 received information on the mobile agent capability of the MAR 230. The BSRs 220 use this information to generate agent advertisement.

Figure 9:
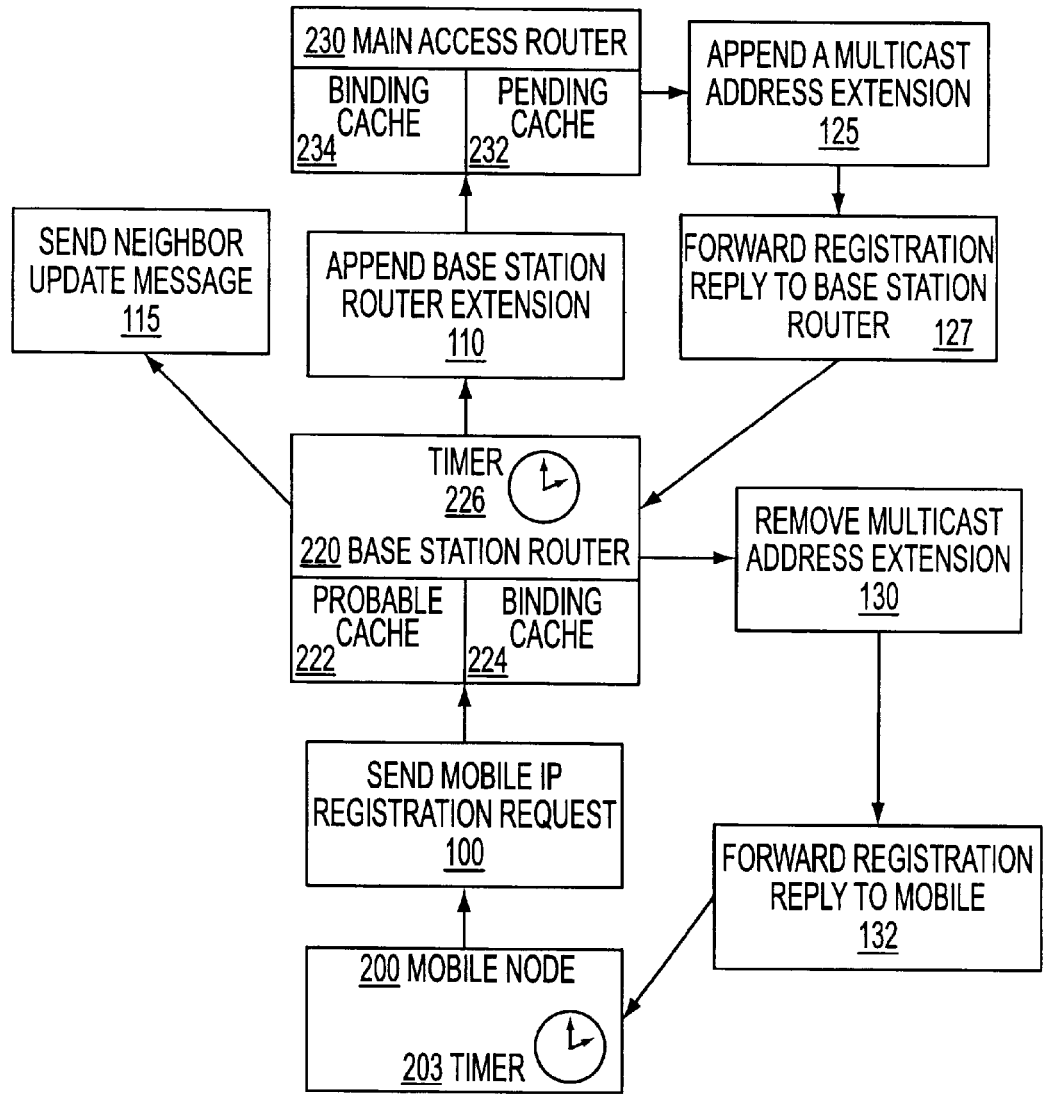
FIG. 9 is a flowchart of the steps involved in registering a mobile in a home domain.

The mobile node 200 entering a point within the home wireless domain 340 will send a mobile IP registration which will cancel any previous binding managed by the home agent 240 (lifetime equals 0) while the mobile node was visiting a foreign wireless domain (or foreign network) 300 (see FIG. 9). It might as well be a new registration request if the mobile devices have just been turned on. The BSR 220 serving the mobile node 200 appends a BSR extension, which will be used by the MAR 230 to forward the registration reply. Next, the MAR home agent assigns a multicast address and creates a binding cache entry for the mobile node 200. The multicast address is sent to the BSR 220 which includes the multicast address extension. The BSR 220 removes the multicast address extension and forwards the registration reply to the mobile node 200. In addition, the BSR 220 sends a neighbor binding update message to the surrounding BSRs 220. While the mobile node 200 moves in the home domain 340, the steps described for movement within the foreign domain 300, are also followed (see section 1.10.4)

1.10.7.2 Traffic Flow

If the correspondent node (CN) 320 (i.e., the node sending packets to or receiving packets from the mobile node 200) is located within the home domain 340, its packets are sent to the mobile node home address, which are intercepted by the MAR 230 of the home domain 340. The MAR 230 creates a tunnel 280 to forward the packets. Next, the destination IP address (or destination address) is set to the multicast IP address (or multicast address) and the source IP address (or source address) is set to the address of the MAR 230. All the BSRs 220 that have subscribed to the multicast group 260 will receive the tunneled packets. Upon receipt of the tunneled packets, the BSRs 220 will remove the outer IP header and forward the inner packet to the mobile node 200.

If the correspondent node 320 is outside the home domain, its packets are transmitted by the MAR 230 of the home domain 340, which applies similar steps as described in the previous paragraph. The MAR 230 creates a tunnel 280 with the destination IP address set to the multicast address and with the source IP address set to the MAR IP address. The packets are then de-tunneled by every BSR 220 that has subscribed to the multicast group 260. Next, the packets sent by the correspondent node 320 are forwarded to the mobile node 200.

1.11 Change in the Protocol Behavior

The present invention is an improvement to the Mobile IP protocol. Under the present invention, the mobile node 200 registers every time it enters a wireless domain, regardless of whether the wireless domain is the mobile node's home domain 340. This allows a multicast distribution tree to be established.

On the other hand, the present invention does not require the BSR 220 that is acting as a pseudo foreign agent to periodically send to the agent an advertisement message. The message is sent only when the BSR 220 determines that the mobile node 200 has newly entered the BSR's coverage area.

1.12 Mobile Node Considerations

Under the present invention, the mobile node 200 implements mobile IP as defined in RFC 2002. When entering a wireless domain, the mobile node 200 sends a mobile IP registration request. This assists in setting up a multicast tunnel within the wireless domain. This registration also removes the pending binding 232 when the mobile node 200 returns to its home domain 340. The mobile node 200 then sets the lifetime to zero as specified in mobile IP [RFC 2002].

In addition, the mobile node 200 keeps track of the pending registration request because these messages may get lost. In such a case, the mobile node 200 sets a timer 203. When the registration lifetime ends, a new mobile IP registration message is triggered. The number of mobile IP registration messages sent is limited.

1.13 The Base Station Considerations

The base station 210 maintains a coverage cache (or fifth cache) 212 which includes link-layer specific information of every mobile node 200 located within its coverage area. In addition, the base station 210 periodically sends mobile node advertisement updates (see section 1.9.1) containing all the link-layer specific information of all the mobile nodes 200 located under its coverage area. The periodicity of this message remains to be defined. The periodicity is linked to the number of base stations 210 attached to the BSR 220 and to the number of users that the BSR 220 can manage. The number of messages sent is limited so that the signaling part of the protocol does not create much overhead.

In addition, when the base station 210 detects that a mobile node 200 has entered its coverage area, it sends a mobile node advertisement message with the sub-type set to "new" (see section 1.9.1) giving the link-layer specific information of the mobile node 200.

1.14 Base Station Router Considerations

The BSR 220 processes the agent advertisement message sent by the MAR 230. In addition, the BSR 220 stores the given information as it will be used when sending local agent advertisement messages to a mobile node 200. The BSR 220 detects a MAR 230 failure when it receives an agent advertisement message with a sequence number equal to zero. If the BSR 220 receives an agent advertisement message with a sequence number different than zero just after its own power-up phase, this indicates that the BSR 220 has rebooted. In this case, all mobile nodes 200 will re-register with their home agent 240. The BSR 220 manages two caches. The binding cache 224 holds the information of all mobile nodes that are currently or were within the coverage area of one of the base stations served by the BSR 220. For example, a mobile node 200 may have been included in the last mobile node advertisement message which will have refreshed the binding cache 224 entry and may have moved under another coverage area managed by another BSR 220.

The probable cache 222 holds the information of mobile nodes 200 that are in the neighborhood. These mobile nodes 200 may appear within the BSR's coverage area in the near future and the information of these mobile nodes 200 is intended to help the handoff process.

The base station 210 processes the mobile node advertisement message. There are two different scenarios depending on the value of the sub-type field.

1. The sub-type field indicates that the mobile node 200 has just entered the coverage area of a base station 210. For the base station router 220, this message either means that the mobile is new in the BSR 220 coverage area or the mobile node 200 has moved under an area covered by another BS 210. The BSR 220 determines the first case by the fact that both its binding cache 224 and probable cache 222 do not contain an entry matching the link-layer information included in the mobile node advertisement message. In such case, the BSR 220 sends a mobile IP agent advertisement message to the mobile node. On the other hand, if the BSR 220 has an entry in the binding cache 224, it means that the mobile node 200 has moved into a new cell and no action is needed.

If the BSR determines that the mobile node has just move into its BSR coverage area because it has an entry in its probable cache matching the mobile node's link layer information in its probable cache. The BSR sends an IGMP (if this is the protocol used) join message to its MAR. The BSR also moves the entry for the mobile node from its probable cache to its binding cache.

2. If the sub-type field indicates an update message, the BSR 220 processes the message, which consists of refreshing the entry in the binding cache 224 of each mobile node 200 included in the list. A single message (i.e. mobile node advertisement update) reflects only a part of the mobile nodes 200 currently located in the BSR coverage area. The BSR 220 must wait until it has received every base station's 210 mobile node advertisement message before removing entries into the binding cache 224. If some entries of the binding cache 224 have expired, these entries should be moved from the binding cache 224 to the probable cache 222. In addition, if the BSR 220 does not implement the "make before break" option, the BSR 220 sends an IGMP leave message to its MAR 230. The lifetime of a binding entry is set to be equal to twice the time needed for the BSR 220 to receive all of the BSRs' 220 mobile node advertisement update messages.

The BSR 220 periodically sends a neighbor update message with a list of mobile node located under its BSR 220 coverage area. This list is sent to all the BSRs 220 in the entire neighborhood. In a preferred embodiment, the list of BSRs 220 in the neighborhood is given to the BSR 220 via network management protocol, SNMP.

The BSR 220 processes every neighbor update message received. Each of these messages includes a list of mobile nodes 200 currently served by a neighboring BSR 220. For each mobile node 200 included in the list, the BSR 220 either creates an entry or refreshes an existing one. To support the "make before break" option, the BSR 220 sends an IGMP join message (the IGMP join message is disclosed in RFC 2236: *Internet Group Management Protocol*, Version 2, W. Fenner, Xerox Parc, RFC 2236, November 1997) to the MAR.

If the entry in the probable cache 222 expires, the entry is deleted and the BSR 220 sends a leave message in the direction of the MAR 230. The lifetime of the probable cache 222 entry is set to twice the sending rate of the neighbor update messages.

For each multicast diffusion group (or multicast group or diffusion group) 260 that matches an entry in the binding cache 224 and for which the BSR 220 has subscribed, the BSR 220 de-tunnels all packets received and forwards them to the respective base stations 210. If the BSR 260 implements the make before break feature, the BSR filters packets sent to the multicast group 260 that do not require packet processing (i.e. because the mobile node have not yet entered the BSR 220 coverage area). The BSR knows the list of mobile nodes 200 that require such processing by consulting the probable cache 222.

If the BSR 220 does not implement the make before break option, and an entry of the probable cache 222 is not refreshed, the BSR 220 sends an IGMP leave message to the MAR. The entry is then removed from the cache 222.

1.15 Main Access Router Considerations

The MAR 230 is the only foreign agent available in the foreign wireless domain 300. After initially booting (or a reboot), the MAR 230 sends an agent advertisement message to all the BSRs 220 of the wireless domain. This message is sent periodically to cover a BSR 220 failure. The first message sent by the MAR 230 after the initial power-up phase has the sequence number set to zero. Furthermore, the MAR 230 processes all registration requests as defined in Mobile IP [RFC 2002] and, in addition, processes all the extensions of the registration request (e.g. NAI extension, AAA extension, reverse tunneling extension . . . ).

Furthermore, the MAR 230 check for the presence of the BSR extension. The MAR 230 rejects the registration request if the BSR extension is not included. The MAR 230 distinguishes between following two cases:

1. The mobile node 200 is registering for the first time (i.e. the binding cache 224 does not have an entry for this mobile node 200).
2. The mobile node is sending a registration request to refresh a current binding (i.e. the binding cache 224 has an entry for this mobile node 200).

In the first case, the MAR 230 creates an entry in its pending cache 234 containing the information included in the registration request. If the MAR 230 receives a second registration request from the same mobile node 200 while the first registration request is currently processed (i.e. the pending cache 234 has an entry for this mobile node 200), the MAR 230 checks the content of the BSR extension present at the end of the registration request. This is done to determine whether the mobile node 200 may have moved to another BSR 220 coverage area. The MAR 230 updates the entry in the pending cache to reflect the change since the registration reply is sent to this new BSR 220. If the registration request is identical to the first one, the MAR 230 processes the registration and forwards it the home agent 240.

In addition, the MAR 230 processes all the extensions included in the registration. To do this, the MAR 230 will interface with a local AAA server to grant the mobile node's access. If the home agent 240 grants the registration request, the MAR 230 assigns a multicast address and associated with the mobile node 200. The MAR 230 appends the multicast address extension to the end of the registration reply and forwards the message to the BSR 220 that has forwarded the registration request. The MAR 230 then creates a binding entry holding the information of the association (binding and multicast address).

If the MAR 230 finds that the registration request of the mobile node 200 is sent to refresh its current binding, the MAR 230 forwards the registration to the mobile node's home agent 240. In addition, the MAR 230 appends the multicast address extension to the end of the registration reply received from the home agent 240. This extension includes the same multicast address that has been allocated during the processing of the initial registration request.

While the invention has been disclosed in this patent application by reference to the details of preferred embodiments of the invention, it is to be understood that the disclosure is intended in an illustrative rather than in a limiting sense, as it is contemplated that modification will readily occur to those skilled in the art, within the spirit of the invention and the scope of the appended claims and their equivalents.

What is claimed is:

1. A method for registering a mobile node to enable multicasting an internet protocol (IP) message in a wireless network having multiple domains, wherein each domain includes a main access router attached to a plurality of base station routers, and wherein each base station router is connected to one or more base stations for communicating with mobile stations in a coverage area of the base station router, comprising the steps of:

receiving by the base station router a neighbor update extension message from an adjacent base station router in the first domain, wherein the neighbor update extension message includes information on mobile nodes with entries in the binding cache of the adjacent base station router;

creating an entry in a probable cache for each mobile node listed in the neighbor update extension message;

receiving by a base station router in a first domain a mobile node advertisement message, wherein the mobile node advertisement message is transmitted by a base station in a coverage area of the base station router to inform the base station router of a mobile node entering its coverage area;

receiving by the base station router a mobile IP registration request, wherein the mobile IP registration request includes information on a request to access the wireless network by the mobile node entering the coverage area of the base station router, and wherein the mobile node is not in its home network;

in response to receiving the mobile node advertisement message or the mobile IP registration request, searching by the base station router, the probable cache for an entry for the mobile node requesting access to the wireless network;

in response to determining no entry in the probable cache for the mobile node, performing the following steps:

appending an IP address of the base station router in a BSR extension to the mobile IP registration request;

transmitting by the base station router the mobile IP registration request with the BSR extension to the main access router in the fist domain;

receiving a mobile IP registration reply from the main access router, wherein the mobile IP registration reply has a multicast address extension for providing a multicast address assigned to the mobile node;

creating an entry in a binding cache of the base station router having information on the mobile node and assigned multicast address extension and deleting any entry for the mobile node in the probable cache; and removing the multicast address extension from the mobile IP registration reply and forwarding a registration reply to the mobile node.

2. The method of claim 1, further comprising the steps of:

in response to determining an entry exists in the probable cache for a mobile node requesting a mobile IP registration, performing the following steps;

moving the entry from the probable cache to the binding cache; and subscribing to a multicast group corresponding to a multicast address assigned to the mobile node.

3. The method of claim 1, further comprising the steps of:

in response to receiving the mobile IP registration request with the BSR extension, creating an entry for the mobile node in a pending cache of the main access router that includes the IP address of the base station router in the BSR extension;

transmitting a registration request of the mobile node to a home agent in a home network domain for the mobile node;

in response to receiving a registration reply from the home agent granting access to the mobile node, transferring the entry in the pending cache to a new entry in a binding cache; and assigning a multicast address to the mobile node and forwarding the mobile IP registration reply to the base station router, wherein the mobile IP registration reply includes a multicast address extension.

4. The method of claim 1, further including, transmitting by the base station router to other adjacent base station routers in the first domain a neighbor update extension message, wherein the neighbor update extension message includes information on mobile nodes with entries in the binding cache of the base station router.

5. The method of claim 4, wherein the step of transmitting the neighbor update extension message includes providing the mobile node address, care-of address, home agent address, multicast address, link layer information and duration of registration for each mobile node found in the binding cache of the base station router.

6. The method of claim 3, further comprising the steps of:

receiving by the main access router in the first domain tunneled IP packets addressed to the mobile node from a home network for the mobile node;

determining if a valid entry exists for the mobile node in the binding cache of the main access router;

in response to determining a valid entry for the mobile node, setting a destination address in the IP packets with the multicast address assigned to the mobile node; and transmitting the IP packets to each base station router subscribed to the multicast address.

7. The method of claim 1, further comprising the steps of:

in response to creating an entry in a probable cache for each mobile node listed in the neighbor update extension message, subscribing by the base station router to a multicast group corresponding to a multicast address for each mobile node in the probable cache.

\* \* \* \* \*